United States Patent [19]

Burns et al.

[11] Patent Number: 4,787,042

[45] Date of Patent: Nov. 22, 1988

[54] LIMITING AIRCRAFT VERTICAL ACCELERATION RESPONSE

[75] Inventors: Roger D. Burns; Larry A. Anspach, both of Cedar Rapids, Iowa

[73] Assignee: Rockwell International Corporation, El Segundo, Calif.

[21] Appl. No.: 799,222

[22] Filed: Nov. 18, 1985

[51] Int. Cl.$^4$ .............................................. G05D 1/06
[52] U.S. Cl. ................................... 364/433; 318/584; 244/181
[58] Field of Search ............... 364/433, 434, 424, 453; 318/584; 244/180, 181, 17.13

[56] References Cited

U.S. PATENT DOCUMENTS

| | | | |
|---|---|---|---|
| 3,510,090 | 5/1970 | Falkner et al. | 244/180 |
| 3,510,092 | 5/1970 | Hendrick et al. | 244/180 |
| 3,578,269 | 5/1971 | Kramer et al. | 244/180 |
| 3,801,049 | 4/1974 | Simpson et al. | 318/584 |
| 4,378,518 | 3/1983 | Nixon | 244/180 |

OTHER PUBLICATIONS

Burns, "Attitude and Acceleration Peformance in the Flight Control System", 1983, IEEE Aerospace, pp. 8.2.1-8.2.4.

Primary Examiner—Parshotam S. Lall
Assistant Examiner—Thomas G. Black
Attorney, Agent, or Firm—Robert C. Mayes; Gregory G. Williams; H. Fredrick Hamann

[57] ABSTRACT

The presently-disclosed invention utilizes sensed pitched rate and sensed vertical acceleration to prevent aberrant pitch rate command outputs as a function of lead compensated sensed acceleration, controlling the vertical acceleration by sensing when a maximum is approached. When the lead compensated acceleration exceeds a first predetermined acceleration factor, the presently-sensed pitch rate replaces the pre-programmed maximum pitch rate factor as the temporary maximum rate, to temporarily prevent additional vertical acceleration due to increasing pitch rate. This apparatus requires no airspeed input and does not interfere with flight performance characteristics during normal flight operations, allowing higher torque servos to be used, and thus improves overall performance.

3 Claims, 3 Drawing Sheets

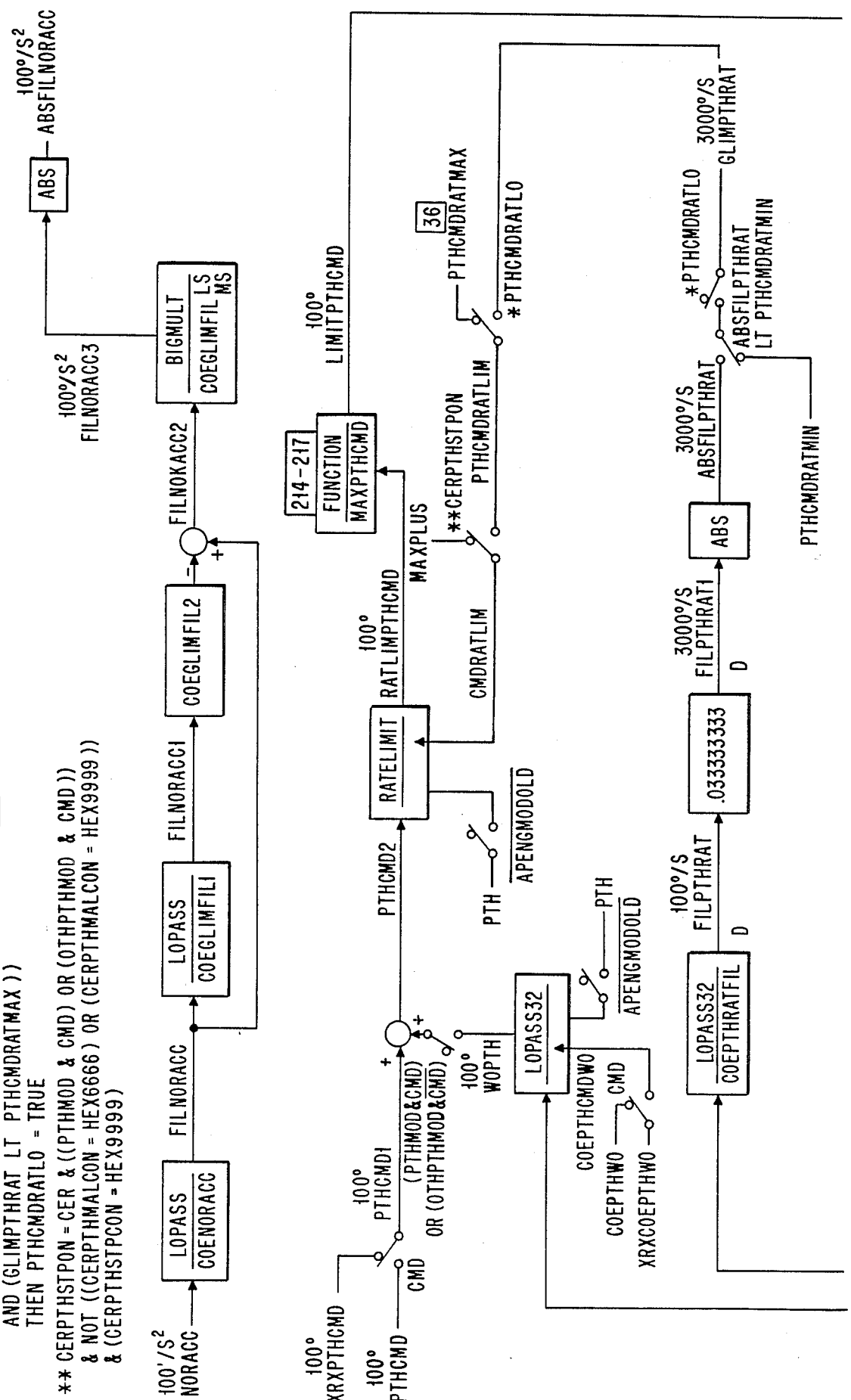

LIMITING AIRCRAFT VERTICAL ACCELERATION RESPONSE

REFERENCE

An appendix containing a software flow diagram, code writing standards, and an exemplary computer program is appended hereto.

BACKGROUND OF THE INVENTION

Aircraft autopilot devices are typically engineered to control the aircraft during most typical flight operations and in more complex systems include roll and yaw stabilization, heading control, navigation control and pitch stabilization.

The pitch rate sensor, typically a rate gyro, senses the rate of pitch change (with reference to the aircraft longitudinal axis, nose-to-tail angle relative to the horizontal axis), and outputs a signal useful to generate a correction to control the pitch rate of the aircraft.

A problem is noted in that the performance of the aircraft is a function of the servos controlling the respective control surfaces of the aircraft. Their relative torque factors coupled through gearing to provide pitch rates acceptable at slower speeds, can be entirely unacceptable at higher speeds due to the excessive vertical acceleration forces on the airframe during a pitch rate command output that would otherwise be acceptable. Accordingly, the pitch rate has typically been limited by an airspeed factor input by a sensor to the autopilot. This factor reduces the allowable pitch rate command output as the aircraft speed increases.

This system works well in most instances; however, it requires an airspeed input to the autopilot so that pitch rate output can be varied accordingly.

It is an object of the present invention to provide a variably limited pitch rate command output in an aircraft to limit vertical acceleration, without requiring an airspeed input.

It is a further object of the present invention to provide a vertical acceleration limited pitch command output apparatus for an autopilot without any requirement for an airspeed sensor or airspeed compensation.

SUMMARY

Briefly, and in accordance with the present invention, an autopilot pitch command apparatus having a specified maximum pitch rate control output comprises first means for receiving a sensed vertical acceleration signal, second means for receiving a sensed pitch rate signal, third means coupled to said first means for lead compensating said sensed vertical acceleration signal, and fourth means coupled to the second means and to the third means for detecting when said lead compensated acceleration signal exceeds the absolute value of a first predetermined factor and for requiring the autopilot pitch command apparatus to limit the maximum pitch control output to the presently-sensed pitch rate as a function of said detection. This requires a vertical acceleration sensor, a pitch rate signal, and a lead compensation signal coupled to the vertical acceleration signal input. The lead compensated acceleration signal is input into a logic detector fourth means which senses when the aircraft is approaching maximum vertical acceleration and causes the pitch command apparatus to select the sensed present pitch rate as the maximum. Because this is invariably less than the design pitch rate maximum and requires the aircraft to maintain the present pitch rate, the maximum vertical acceleration is thereby limited. A situation wherein the vertical acceleration is rapidly approaching the design maximum for the aircraft is transitory and brief in duration. By use of the present apparatus, the prior art requirement for an airspeed input to vary the maximum allowable pitch rate as a function of airspeed is entirely eliminated. The hypothesis that the airspeed will be constant throughout this control period holds very well, since the vertical acceleration as lead compensated is precisely the variable desired to be controlled, and further since the problem is essentially transitory.

As the sensed vertical acceleration (lead compensated) drops back away from the design maximum for the aircraft, the maximum allowable pitch rate command output for the autopilot is reinstituted as the operational maximum. This reestablishes the full performance potential of the aircraft.

The use of this apparatus allows higher torque servos and gearing to produce a very responsive performance characteristic for the aircraft, and still allows limiting of the maximum allowable pitch to control vertical acceleration within specified limits.

Additionally, since the actual pitch rate output is not changed, but merely limited, this apparatus may be engaged and disengaged with no control signal discontinuities or other noticable physical control deviations beyond the smooth control of the vertical acceleration forces.

BRIEF DESCRIPTION OF THE DRAWINGS

The novel aspects of the present invention may be more readily ascertained by reference to the specification in combination with the drawings in which:

FIG. 3 and 3a are function circuit diagrams to further aid in the understanding of the invention.

DETAILED DESCRIPTION

Figure 1:
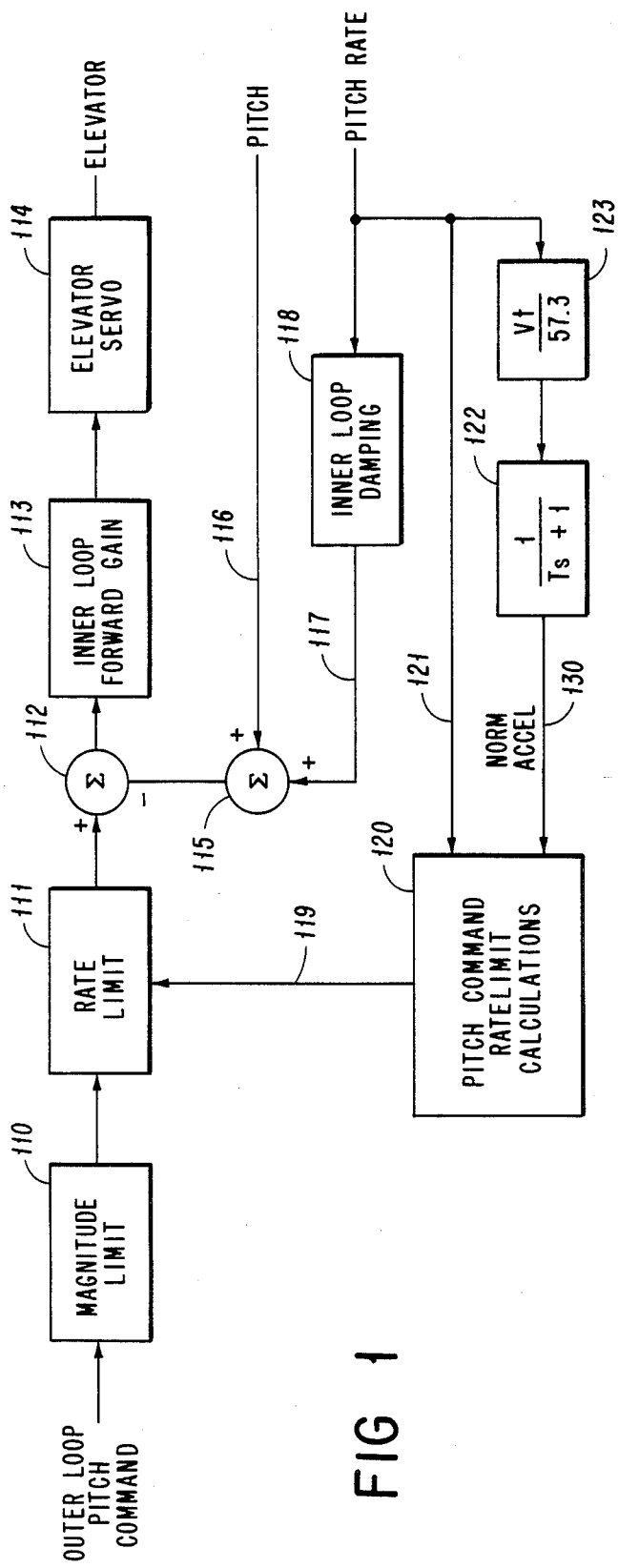
FIG. 1 is a block diagram of a typical autopilot pitch control apparatus in accordance with the present invention.

Referring now to FIG. 1, the configuration for a pitch control apparatus capable of incorporating the present invention is shown wherein an outer loop pitch command is provided to a magnitude limit block 110, and thereafter to the rate limit block 111. Rate limit block 111 provides the maximum command rate limit output to summer 112 as a function of the input 119 from the pitch command rate limit calculations at block 120. Summer 112 incorporates a pitch feedback 116 and pitch rate feedback through inner loop damping block 118, to provide signal 117, which is thereafter summed with signal 116 in summer 115. This feedback signal is thereafter subtracted from the outer loop pitch command, having its magnitude and rate limited into summer 112 to provide a signal to the inner loop forward gain block 113 and thereafter to the elevator servo 114 for actual control of the elevator. The feedback pitch rate signal 121 is also provided to the pitch command rate calculation block 120 as is the actual normal acceleration ($A_z$) on line 130 after being converted from pitch rate through a true airspeed conversion block 123 and lowpass filter 122. The normal acceleration is a sensed signal and the scale factor $V_T/573$ and the lowpass filter 122 represent aircraft dynamics, for this configuration. It can be seen therefore that this autopilot pitch command apparatus is adaptable to a multitude of aircraft without significant airframe-dependent changes required.

Figure 2:
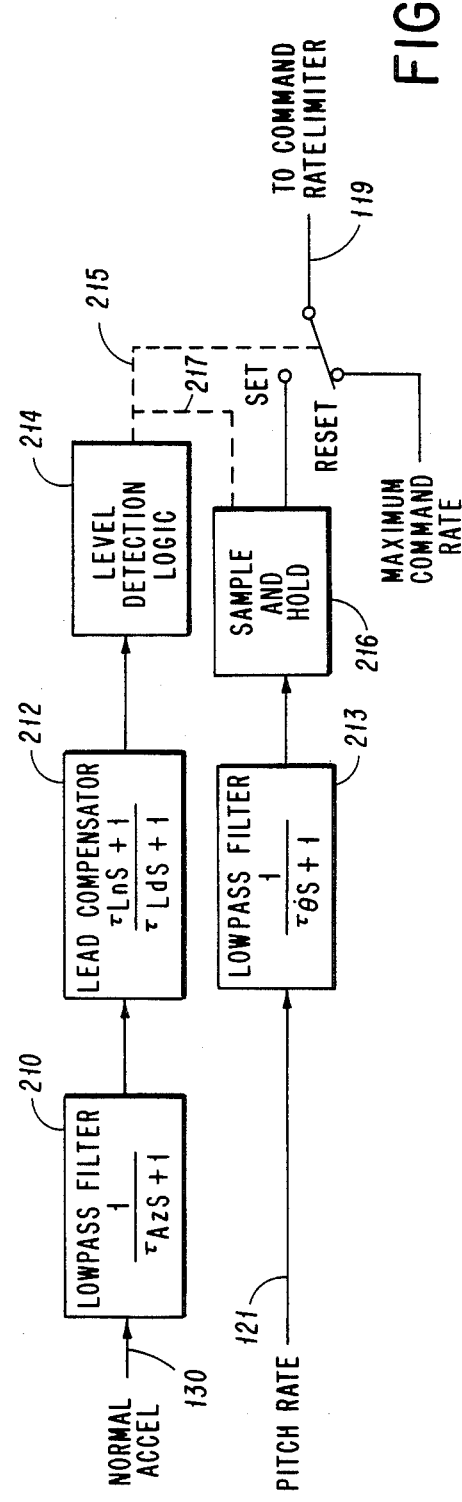
FIG. 2 is a block diagram of the lead compensated acceleration input coupled to the level detection logic for controlling the maximum pitch command rate during excessive vertical acceleration periods.
Figure 3A:
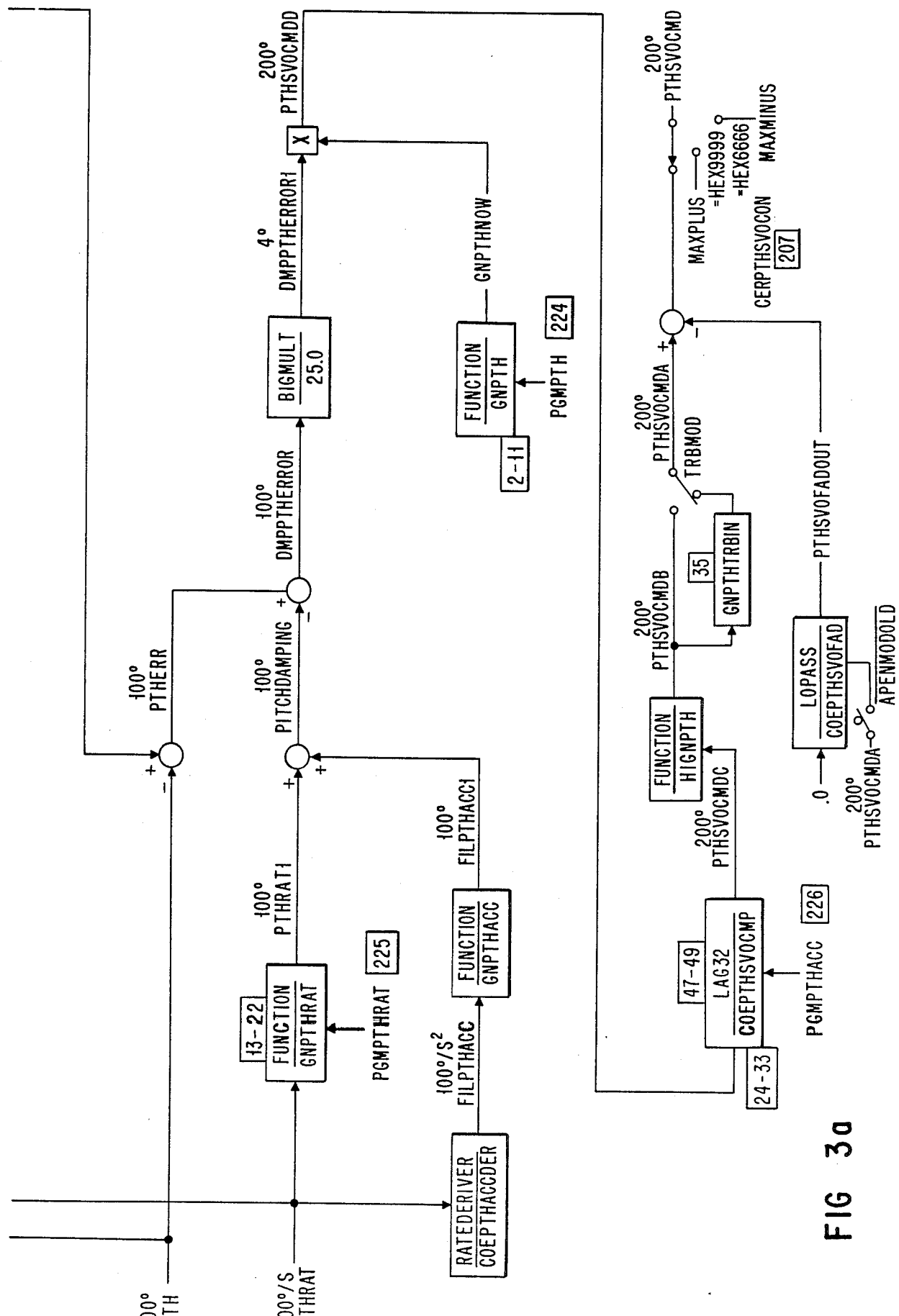

The pitch command rate limit calculations block 120 contains the apparatus shown in FIG. 2, having normal acceleration 130 input as well as pitch rate 121 and outputs a rate limit command 119 to rate limit block 111.

Referring now to FIG. 2, the sensed normal acceleration 130 is provided to lowpass filter 210 (essentially for noise effect suppression), and thereafter provided to the lead compensator 212 for detecting when excessive $A_z$ is anticipated. This signal is then output to the level detection logic 214 and a control signal is output on line 215 to set the present pitch rate to the commanded rate maximum when the level is exceeded. On line 217, a sample-and-hold circuit 216 is useful in determining the actual present pitch rate 121 subsequent to its being filtered in lowpass filter 213, to maintain a constant pitch rate maximum output on line 119. When lead compensator 212 detects a decrease in normal acceleration, the level detection logic 214 switches back to the maximum command rate to normal operation.

The following is an approximation of the relationship between pitch rate and normal acceleration, wherein:

$$A_z = \frac{V_t}{57.3}\left(\frac{1}{tS+1}\right)\theta$$

where:

$A_z$ = normal acceleration (beat/second/second),
$V_t$ = true airspeed (feet/second),
$t$ = acceleration lag time constant of the aircraft dynamics (seconds),
$\theta$ = pitch rate (degrees/second). Thus, it can be seen in FIG. 2 that the calculations used in setting the actual pitch rate command as a function of sensed excessive vertical acceleration is useful in directly controlling the desired parameter, normal acceleration. No input for actual airspeed is required and the normal acceleration data is filtered to eliminate noise. The normal acceleration is then lead compensated to account for the lag inherent in the relationship between the normal acceleration and pitch rate expressed in the equation above. When this signal exceeds the desired acceleration, the present pitch rate is first processed by lowpass filter 213 to compensate for noise and variations in the lag time constant and then loaded into the rate limiter as a temporary maximum. When the processed acceleration returns to a value somewhatlower than the original trip point, the rate limit is returned to its normal maximum value. In actual operation, the difference between the trip point and the return point provides a hysteresis allowing a smooth transition between maximum command rate and present pitch rate.

Significantly, the flight control performance is not compromised by limiting the servo torque as in a typical approach to this problem. Rather, the maximum servo output is directly controlled by sensed normal acceleration and therefore higher torque servos can be used to increase performance.

Additionally, under normal operations the autopilot inner loop stability is not adversely affected since the rate limit is normally set at a maximum command rate.

This technique is broadly applicable to a variety of aircraft types since the fundamental basis for this method of command rate limiting is direct sensing of the parameter to be controlled (normal acceleration) and therefore increased simplicity and improved performance for the aircraft are provided. The actual time of implementation under typical circumstances will be less than three (3) seconds, and therefore the requirement for any sensed true airspeed input to the control is eliminated. This significant advantage further enhances the simplicity of implementation and breadth of application of the present invention.

Implementation of the present embodiment was in the software program of a Collins digital autopilot. The appendix accompanying this specification contains the actual software program, a softwar functional block diagram, and a terminology glossary for the software labels actually used. The novel technique discussed herein, however, is readily adapted to a variety of hardware and software combinations or purely hardware logic implementation by one of ordinary skill in the art, by reference to FIGS. 1 and 2 in conjunction with this specification.

In this embodiment, the lead compensation maintains a 3:1 ratio in block 212, and the level detection logic 214 is set to trip in at 0.4 g's vertical acceleration and to trip out at 0.2 g's. The pitch rate lowpass filter 213 is set at a 1.0 second lag and the maximum command rate is set at 3.75° per second, which will provide for 0.41 g's vertical acceleration at approximately 120 knots. It can be seen therefore that the actual values can be changed to coincide with desired aircraft characteristics, including maximum allowable vertical acceleration and maximum pitch rate command to suit a particular design specification.

While the present invention has been described with respect to a specific embodiment disclosed herein, it is not intended that this description be construed in a limiting sense. Various modifications of the illustrative embodiment disclosed herein, as well as other embodiments of the invention, will be apparent to persons skilled in the art upon reference to this description. It is therefore contemplated that the appended claims will cover any such modifications of embodiments as fall within the true scope of the invention.

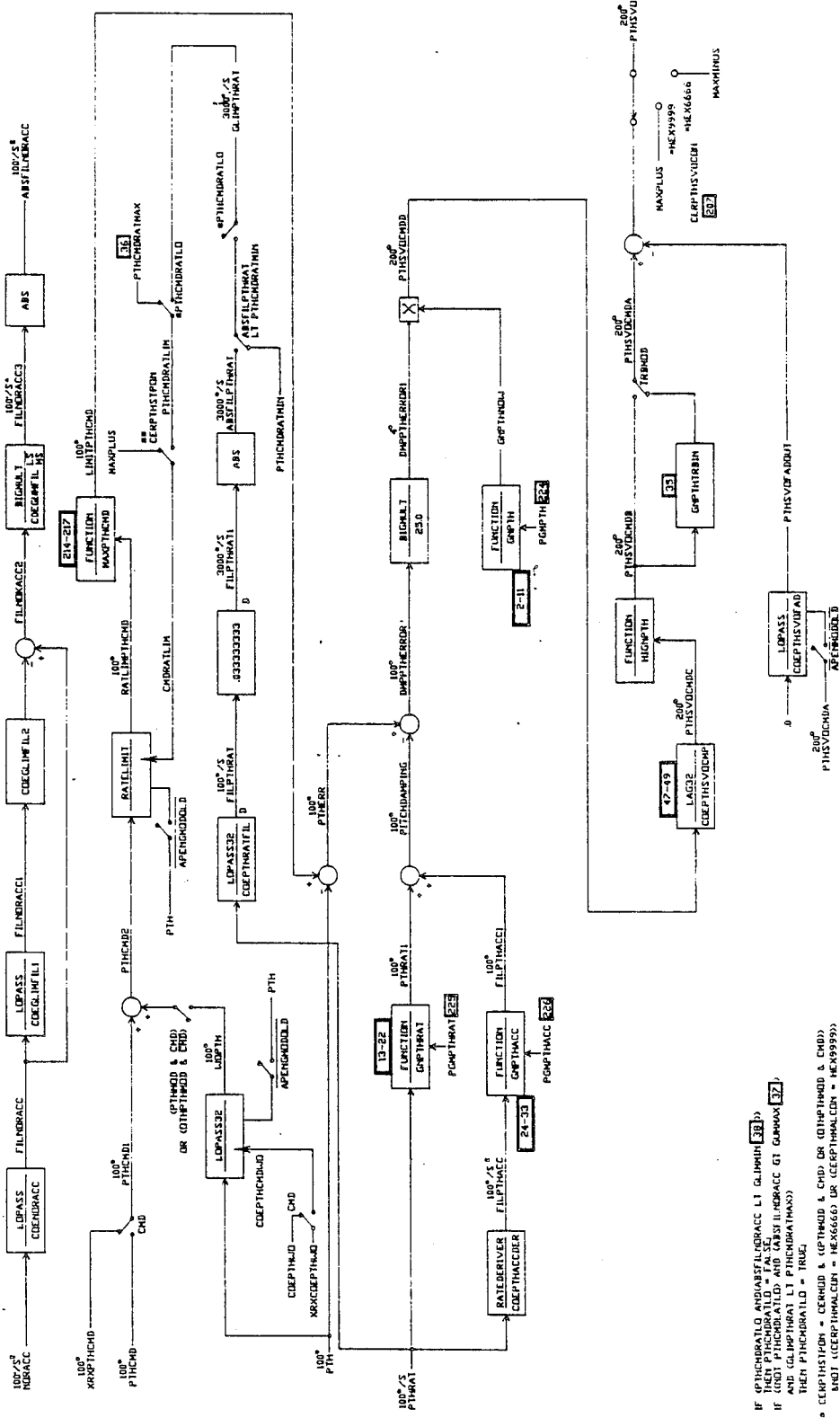

7. CODE WRITING STANDARDS

THIS CHAPTER APPLIES ONLY TO THE MAIN PROCESSORS.

7.1. NAMES

ALL NAMES USED IN THE APS-85 MAIN PROCESSORS'S SOURCE CODE ARE FORMED USING COMBINATIONS OF WORDS AND ABBREVIATIONS FROM THE TABLE THAT FOLLOWS. THIS TABLE HELPS IN QUICK DECODING (UNDERSTANDING) OF ALL NAMES USED IN THE PROGRAM. SEE THE 'DYNAMICS DIAGRAMS, VARIABLE NAMES' SECTION OF THIS DOCUMENT FOR FURTHER INFORMATION REGARDING HOW THE NAMES WERE CHOSEN.

7.1.1. ABBREVIATIONS

| | | |
|---|---|---|
| A | -- | AILERON, ALONG, ALTITUDE, ANTENNA, ACCESS |
| ABS | -- | ABSOLUTE |
| ACC | -- | ACCELERATION |
| ACR | -- | AUXILIARY CONTROL REGISTER |
| ACT | -- | ACTIVE |
| ADC | -- | AIR DATA COMPUTER |
| ADDR | -- | ADDRESS |
| ADR | -- | ADDRESS |
| ADV | -- | ADVERSE, ADVISORY |
| AFT | -- | AFTER |
| AHRS | -- | ATTITUDE-HEADING REFERENCE SYSTEM |
| AIL | -- | AILERON |
| ALT | -- | ALTIMETER, ALTITUDE |
| ANA | -- | ANALOG |
| ANG | -- | ANGLE, ANGULAR |
| ANN | -- | ANNUNCIATOR |
| ANS | -- | ANSWER |
| ANT | -- | ANTENNA |
| AP | -- | AUTOPILOT |
| APP | -- | APPROACH |
| ARINC | -- | AERONAUTICAL RADIO INCORPORATED |
| AS | -- | AIRSPEED |
| ASC | -- | AMERICAN STD. CODE FOR INFORMATION INTERCHANGE |
| ASCII | -- | AMERICAN STD. CODE FOR INFORMATION INTERCHANGE |
| ATT | -- | ATTITUDE |
| B | -- | BOTTOM |
| BAC | -- | BACK |
| BAR | -- | BAROMETRIC |
| BC | -- | BACKCOURSE |
| BEF | -- | BEFORE |
| BIA | -- | BIAS |
| BLK | -- | BLOCK |
| BNK | -- | BANK |
| BRG | -- | BEARING |
| BRK | -- | BREAK |
| BST | -- | BOOST |
| BYT | -- | BYTE |
| C | -- | CODE, CONTROL, COUNTER, CENTER |
| CAP | -- | CAPTURE |
| CER | -- | CERTIFICATION |
| CERT | -- | CERTIFICATION |
| CHK | -- | CHECK |
| CHN | -- | CHANNEL |
| CLI | -- | CLIMB |
| CLK | -- | CLOCK |
| CLR | -- | CLEAR |
| CLN | -- | CLEAN |

| | | |
|---|---|---|
| CMD | -- | COMMAND |
| CMP | -- | COMPENSATED, COMPENSATION, COMPUTED, COMPLIMENTED, COMPARATOR |
| CNT | -- | COUNT |
| CNTNT | -- | CONTENTION |
| COD | -- | CODE |
| COE | -- | COEFFICIENT |
| COL | -- | COLUMN |
| CON | -- | CONTROL |
| COP | -- | COPILOT |
| COR | -- | COORDINATION |
| CPL | -- | COUPLED |
| CRO | -- | CROSS |
| CRS | -- | COURSE |
| CRT | -- | CATHODE RAY TUBE |
| CRU | -- | CRUISE |
| CSDB | -- | COLLINS SERIAL DATA BUS (PROLINE BUS) |
| CTL | -- | CONTROL |
| CTR | -- | COUNTER |
| CTS | -- | COLLINS TEST SET |
| CUR | -- | CURRENT, CURSOR |
| CUT | -- | CUTOUT |
| D | -- | DATA, DISPLAY |
| DAT | -- | DATA, DATUM |
| DAU | -- | DATA ACQUISITION UNIT |
| DC | -- | DUTY CYCLE |
| DDR | -- | DATA DIRECTION REGISTER |
| DEL | -- | DELAYED |
| DER | -- | DERIVER |
| DES | -- | DECISION, DESCENT, DESCEND, DESTINATION |
| DET | -- | DETENT |
| DEV | -- | DEVIATION |
| DIA | -- | DIAGNOSTICS |
| DIAG | -- | DIAGNOSTICS |
| DIF | -- | DIFFERENCE |
| DIR | -- | DIRECTOR, DIRECTION |
| DIS | -- | DISTANCE, DISENGAGE |
| DIV | -- | DIVIDE |
| DLT | -- | DELTA |
| DLY | -- | DELAY |
| DMA | -- | DIRECT MEMORY ACCESS |
| DMD | -- | DEMODULATOR |
| DME | -- | DISTANCE MEASURING EQUIP. |
| DMP | -- | DAMPING |
| DN | -- | DOWN |
| DR | -- | DEAD RECKONING |
| DSB | -- | DISABLE |
| DSP | -- | DISPLAY |
| DUART | -- | DUAL UNIVERSAL ASYNCHRONOUS RECEIVER-TRANSMITTER |
| DUN | -- | DONE |
| DV | -- | DEVIATION |
| E | -- | ELEVATOR, EXTRA |
| EDC | -- | ENGINE DATA COMPUTER |
| EFIS | -- | ELECTRONIC FLIGHT INSTRUMENT SYSTEM |
| ELE | -- | ELEVATOR |
| ENA | -- | ENABLE |
| ENB | -- | ENABLE |
| ENG | -- | ENGAGE |
| ENT | -- | ENTRY |
| EOI | -- | END OF INTERRUPT |
| EQ | -- | EQUALIZED |
| ERR | -- | ERROR |
| ES | -- | EXTRA SEGMENT |
| EST | -- | ESTIMATE |
| EUL | -- | EULER |
| EXI | -- | EXIT |
| EXT | -- | EXTENSION, EXTERNAL |
| FAD | -- | FADE, FADER |
| FAL | -- | FAIL |

| | | |
|---|---|---|
| FAUL | -- | FAULT |
| FBK | -- | FEEDBACK |
| FCC | -- | FLIGHT CONTROL COMPUTER |
| FIL | -- | FILTER, FILTERED |
| FIX | -- | FIXED |
| FL | -- | FILTER |
| FLA | -- | FLASH |
| FLG | -- | FLAG |
| FLO | -- | FLOW |
| FLP | -- | FLAPS |
| FLT | -- | FLIGHT |
| FMC | -- | FLIGHT MANAGEMENT COMPUTER |
| FR | -- | FRACTIONAL |
| FRC | -- | FORCE |
| FRM | -- | FROM |
| FRQ | -- | FREQUENCY |
| FST | -- | FAST |
| FUL | -- | FULL |
| FWD | -- | FOREWARD |
| G | -- | G'S |
| GA | -- | GO AROUND |
| GAMA | -- | GAMMA |
| GN | -- | GAIN |
| GND | -- | GROUND |
| GS | -- | GLIDESLOPE |
| GT | -- | GREATER THAN |
| GYR | -- | GYRO |
| H | -- | HIGH, HEADING |
| HD | -- | HEADING |
| HDG | -- | HEADING |
| HDW | -- | HARDWARE |
| HEX | -- | HEXADECIMAL |
| HF | -- | HIGH FREQUENCY |
| HGT | -- | HEIGHT |
| HI | -- | HIGH |
| HLD | -- | HOLD |
| HLF | -- | HALF |
| HP | -- | HIGH PASS |
| HS | -- | HANDSHAKE |
| HSK | -- | HANDSHAKE |
| HVY | -- | HEAVY |
| I | -- | INTEGER |
| IAS | -- | INDICATED AIRSPEED |
| ID | -- | IDENTIFIER |
| IDX | -- | INDEX |
| IER | -- | INTERRUPT ENABLE REGISTER |
| IFR | -- | INTERRUPT FLAG REGISTER |
| IN | -- | INPUT |
| INC | -- | INCREMENT |
| INH | -- | INHIBIT |
| INI | -- | INITIAL |
| INIT | -- | INITIALIZE |
| INP | -- | INPUT |
| INT | -- | INTEGRATOR, INTERNAL, INTERRUPT |
| INV | -- | INVERSE |
| IO | -- | INPUT/OUTPUT, I/O PROCESSOR |
| IOC | -- | INPUT OUTPUT CONCENTRATOR |
| KNB | -- | KNOB |
| L | -- | LATCH, LEFT, LOOP, LOW |
| LAT | -- | LATERAL |
| LBL | -- | LABEL |
| LCL | -- | LOCAL |
| LGC | -- | LOGIC |
| LIM | -- | LIMIT |
| LIN | -- | LINEAR, LINEARIZED, LINE |
| LIT | -- | LIGHT |
| LN | -- | LINEAR |

| | | |
|---|---|---|
| LNV | -- | LINEAR VELOCITY |
| LO | -- | LOW |
| LOC | -- | LOCALIZER, LOCATION |
| LON | -- | LONGITUDINAL |
| LOO | -- | LOOP |
| LP | -- | LOW PASS |
| LS | -- | LEAST SIGNIFICANT |
| LSB | -- | LEAST SIGNIFICANT BITS |
| LT | -- | LEFT, LESS THAN |
| LVR | -- | LEVER |
| M | -- | MILLI, MODE, MEMORY, MIDDLE |
| MAC | -- | MACH |
| MAG | -- | MAGNETIC |
| MAL | -- | MALFUNCTION |
| MAX | -- | MAXIMUM |
| MEAS | -- | MEASURED |
| MED | -- | MEDIUM |
| MEM | -- | MEMORIZED, MEMORY |
| MF | -- | MIDDLE FREQUENCY |
| MFD | -- | MULTI FUNCTION DISPLAY |
| MID | -- | MIDDLE |
| MIN | -- | MINIMUM, MINUS |
| MIX | -- | MIXTURE |
| MKR | -- | MARKER |
| MM | -- | MIDDLE MARKER |
| MMO | -- | MACH (MAX OPERATING) |
| MN | -- | MINIMUM |
| MNV | -- | MANEUVER |
| MOD | -- | MODE |
| MON | -- | MONITOR |
| MOT | -- | MOTOR |
| MPY | -- | MULTIPLY |
| MPX | -- | MULTIPLEX |
| MS | -- | MOST SIGNIFICANT |
| MSG | -- | MESSAGE |
| MSK | -- | MASK, MASKABLE |
| MUL | -- | MULTIPLY |
| MULT | -- | MULTIPLY |
| MUX | -- | MULTIPLEXER |
| N | -- | (GENERAL PURPOSE INDEX NAME), NAVIGATION |
| NAV | -- | NAVIGATION |
| NEG | -- | NEGATIVE |
| NMI | -- | NON-MASKABLE INTERRUPT |
| NO | -- | NUMBER |
| NOR | -- | NORMAL |
| NORM | -- | NORMAL |
| NUM | -- | NUMBER |
| NXT | -- | NEXT |
| OCR | -- | OCCURENCE |
| OFF | -- | OFFSET |
| OM | -- | OUTER MARKER |
| OP | -- | OPTIMUM |
| OPP | -- | OPPOSITE |
| OPT | -- | OPTION |
| OR | -- | OUTPUT REGISTER |
| ORG | -- | ORIGIN |
| OSC | -- | OSCILLATOR |
| OTH | -- | OTHER |
| OUT | -- | OUTPUT |
| OVR | -- | OVER |
| P | -- | PRE, POINTER |
| PAG | -- | PAGE |
| PARAM | -- | PARAMETER |
| PAS | -- | PASS |
| PCB | -- | PERIPHERAL CONTROL BLOCK |
| PCR | -- | PERIPHERAL CONTROL REGISTER |
| PFL | -- | PROFILE |
| PFM | -- | PERFORMANCE |
| PGM | -- | PROGRAMMING |

| | | |
|---|---|---|
| PIL | -- | PILOT |
| PLU | -- | PLUS |
| PND | -- | PENDING |
| PNL | -- | PANEL |
| POL | -- | POLL |
| POS | -- | POSITION, POSITIVE |
| POW | -- | POWER |
| PRB | -- | PROBLEM |
| PRD | -- | PERIOD |
| PRE | -- | PRESELECT, PRESELECTOR, PRESET |
| PRI | -- | PRIORITY |
| PRS | -- | PRESSURE |
| PRT | -- | PORT |
| PTH | -- | PITCH |
| PTR | -- | POINTER |
| PUL | -- | PULSE |
| PWR | -- | POWER |
| QTY | -- | QUANTITY |
| R | -- | RATE, RIGHT |
| RAD | -- | RADAR, RADIO |
| RAM | -- | RANDOM ACCESS MEMORY |
| RAP | -- | REPEAT (MIS-SPELLED) |
| RAT | -- | RATE |
| REF | -- | REFERENCE |
| REL | -- | RELOCATION |
| REP | -- | REPAIR, REPORT, REPEAT |
| REQ | -- | REQUEST |
| RES | -- | RESET, RESULT |
| REV | -- | REVERSAL, REVISION, REVERSE (BACK COURSE) |
| RH | -- | RIGHT HAND |
| RID | -- | RIDE |
| T | -- | TIMER, TABLE (ASSEMBLER DIRECTIVE), TOP |
| TAE | -- | TRACK ANGLE ERROR |
| TAK | -- | TAKE |
| TAS | -- | TRUE AIRSPEED |
| TBL | -- | TABLE |
| TEMP | -- | TEMPORARY |
| TF | -- | TO-FROM |
| THR | -- | THRESHOLD |
| TIM | -- | TIME |
| TKL | -- | TICKLE |
| TMR | -- | TIMER |
| TRB | -- | TURBULENCE |
| TRK | -- | TRACK |
| TRM | -- | TRIM |
| TRN | -- | TURN |
| TRP | -- | TRIP |
| TRQ | -- | TORQUE |
| TRU | -- | TRUE |
| TST | -- | TEST |
| TTL | -- | TITLE |
| TURB | -- | TURBULENCE |
| TWO | -- | TWO'S |
| TX | -- | TRANSMIT |
| TXT | -- | TEXT |
| TYP | -- | TYPE |
| U | -- | UPPER |
| UAR | -- | UART |
| USART | -- | UNIVERSAL SYNCHRONOUS-ASYNCHRONOUS RECEIVER-TRANSMITTER |
| VAL | -- | VALUE |
| VEL | -- | VELOCITY |
| VER | -- | VERTICAL, VERSION |
| VIA | -- | VERSATILE INTERFACE ADAPTER |
| VL | -- | VOR-LOCALIZER |
| VLD | -- | VALID |
| VLT | -- | VOLTS |
| VMO | -- | VELOCITY (MAXIMUM OPERATING) |

```
VNAV   --  VERTICAL NAVIGATION
VNV    --  VERTICAL NAVIGATION
VOR    --  VERY HIGH FREQUENCY OMNIDIRECTIONAL
               RANGE STATION
VS     --  VERTICAL SPEED
VUE    --  VIEW
W      --  WITH, WORD (ASSEMBLER DIRECTIVE)
WGT    --  WEIGHT
WIN    --  WIND
WO     --  WASHOUT
WRAP   --  WRAP-AROUND
WRD    --  WORD
WRG    --  WRONG
T      --  TIMER, TABLE (ASSEMBLER DIRECTIVE), TOP
TAE    --  TRACK ANGLE ERROR
TAK    --  TAKE
TAS    --  TRUE AIRSPEED
TBL    --  TABLE
TEMP   --  TEMPORARY
TF     --  TO-FROM
THR    --  THRESHOLD
TIM    --  TIME
TKL    --  TICKLE
TMR    --  TIMER
TRB    --  TURBULENCE
TRK    --  TRACK
TRM    --  TRIM
TRN    --  TURN
TRP    --  TRIP
TRQ    --  TORQUE
TRU    --  TRUE
TST    --  TEST
TTL    --  TITLE
TURB   --  TURBULENCE
TWO    --  TWO'S
TX     --  TRANSMIT
TXT    --  TEXT
TYP    --  TYPE
U      --  UPPER
UAR    --  UART
USART  --  UNIVERSAL SYNCHRONOUS-ASYNCHRONOUS
               RECEIVER-TRANSMITTER
VAL    --  VALUE
VEL    --  VELOCITY
VER    --  VERTICAL, VERSION
VIA    --  VERSATILE INTERFACE ADAPTER
VL     --  VOR-LOCALIZER
VLD    --  VALID
VLT    --  VOLTS
VMO    --  VELOCITY (MAXIMUM OPERATING)
VNAV   --  VERTICAL NAVIGATION
VNV    --  VERTICAL NAVIGATION
VOR    --  VERY HIGH FREQUENCY OMNIDIRECTIONAL
               RANGE STATION
VS     --  VERTICAL SPEED
VUE    --  VIEW
W      --  WITH, WORD (ASSEMBLER DIRECTIVE)
WGT    --  WEIGHT
WIN    --  WIND
WO     --  WASHOUT
WRAP   --  WRAP-AROUND
WRD    --  WORD
WRG    --  WRONG
WRP    --  WRAP-AROUND
X      --  CROSS, X-COORDINATE
XFR    --  TRANSFER
XY     --  XY-COORDINATES
Y      --  Y-COORDINATE
```

```
YD   --  YAW DAMPER
32   --  32 BITS
65   --  6502 MICROPROCESSOR
86   --  8086 MICROPROCESSOR
```

7.2. DATA, TYPES

TYPE CHECKING IS NOT PERFORMED BY THE LINKER. THIS ALLOWS THE SAME VARIABLE TO BE DECLARED AS A DIFFERENT TYPE IN DIFFERENT MODULES. THIS CAPABILITY IS USED ONLY WHEN IT ENHANCES THE OVERALL PROGRAM ( IE RELIABILITY, READABILITY, ETC ).

IN ALL MODULES EXCEPT 'STATUS', 'RAM', 'ROM', AND 'DMA', A VARIABLE MAY BE DECLARED TO BE ANY 'TYPE'. HOWEVER, IN 'STATUS', 'RAM', 'ROM', AND 'DMA' MODULES, THE DECLARED 'TYPE' SHOULD BE THE SAME AS THE ACTUAL DATA STORED IN A VARIABLE.

7.3. MODULE SUBSECTIONS

EVERY PL1 SOURCE MODULE CONFORMS TO THE FOLLOWING ARBITRARY STRUCTURING TO PROVIDE A UNIFORMLY READABLE FORMAT WITHIN ALL MODULES.

7.3.1. PURPOSE / COMMENTS

CAN CONTAIN A SIMPLE GENERAL DESCRIPTION OF THE MODULES FUNCTION AND/OR ANY COMMENTS AS REQUIRED. NO HEADER IS USED.

7.3.2. STATUS / HISTORY

THIS SECTION CONTAINS THE PROGRAMMERS NAME, DATE, AND A SHORT DESCRIPTION OF THE CHANGES. NO HEADER IS USED.

7.3.3. DECLARATIONS, ENTRY

THESE DECLARATIONS ARE FOR ALL EXTERNAL ROUTINES THAT ARE CALLED BY THE MODULE.

7.3.4. DECLARATIONS, INPUT

THESE DECLARATIONS ARE FOR EXTERNAL VARIABLES THAT ARE READ-ONLY BY THE MODULE.

7.3.5. DECLARATIONS, I / O

THESE DECLARATIONS ARE FOR EXTERNAL VARIABLES THAT ARE BOTH READ AND WRITTEN BY THE MODULE.

7.3.6. DECLARATIONS, OUTPUT

THESE DECLARATIONS ARE FOR EXTERNAL VARIABLES THAT ARE WRITTEN INTO BY THE MODULE. THESE VARIABLES ARE STORED IN A RAM AREA. IN ADDITION, MODULE OUTPUTS CAN BE VIA A RETURNED PARAMETER, AS LISTED IN THE PROCEDURE STATEMENT. THESE VARIABLES ARE NOT EXPLICITLY DECLARED.

7.3.7. DECLARATIONS, STACK AND/OR SCRATCHPAD

THESE DECLARATIONS ARE USED FOR TEMPORARY VARIABLES THAT ARE

ALWAYS INITIALIZED BEFORE BEING USED. THE PREFERRED DECLARATION FOR THESE VARIABLES IS 'STATIC INITIAL(*)'. A 'STATIC INITIAL(*)' DECLARATION PLACES THE DATA AT A FIXED LOCATION IN THE MEMORY MAP. THIS FACILITATES DEBUGGING, YET DOES NOT CLUTTER UP THE LINK SYMBOL TABLE WITH LOCAL NAMES.

IN THE APS-85 (ONLY) THE LINKER PLACES THIS DATA IN THE DMA AREA, RATHER THAN SCRATCHPAD RAM. THIS IS REQUIRED TO KEEP ENOUGH RAM AVAILABLE FOR CERTIFICATION USAGE.

7.3.8. BASED DECLARATIONS

THESE DECLARATIONS ARE FOR INTERNAL BASED VARIABLES. BASED VARIABLES DO NOT TAKE UP STORAGE SPACE IN ROM OR RAM.

7.3.9. COMPUTATIONS

THIS SECTION CONTAINS THE EXECUTABLE CODE OF THE MODULE.

```
****** PITCHINNER/4  (PL1 SOURCE LISTING) ******
@ELT,L APSRELEASED*8086PL1.PITCHINNER/4
ELT 8R1 S74Q1C 10/15/85 09:09:13 (10)
    1.        06     PITCHINNER: PROCEDURE;
    2.        06
    3.        06     /*  PERFORMS PITCH INNER LOOP COMPUTATIONS.
    4.        06     THIS MODULE MUST BE PRE-PROCESSED BY THE APS*UTILITY.SYNONYMS RUNSTREAM.
    5.        06
    6.        06     13 APR 84  J BURGESS   REV AB, MAKE /3; MOVE INPUT SCALINGS FOR ARINC VERSION;
    7.        06     24 JUL 84  L ANSPACH   REV AC, ADD ENGAGE SYNC TO PITCH WASHOUT AND RATELIMITER
    8.        08     18 SEP 84  J BURGESS   REV AD, MAKE /4 FROM /3; SEQUENCE CHANGE PER VERIFICATION;
    9.        06
   10.        09     25 OCT 84  COLCLOUGH   REV AE, CORRECTION OF G LIMITED CMD RATE
   11.        10     07 NOV 84  L ANSPACH   REV AF, CHG CERT STEP LOGIC; MAKE GLIMPTHRAT EXTERNAL;
   12.        06
   13.        06
   14.        06     /*********  ENTRY DECLARATIONS   **********/
   15.        06
   16.        06     DECLARE BIGMULT           ENTRY ( FRACT BYVALUE, FIXED BYVALUE,
   17.        06                                       FRACT BYVALUE ) RETURNS ( FRACT );
   18.        06     DECLARE FUNCTION          ENTRY ( POINTER, FRACT BYVALUE ) RETURNS ( FRACT );
   19.        06     DECLARE LAG32             ENTRY ( FRACT BYVALUE, FRACT, FRACT(31) )
   20.        06                               RETURNS ( FRACT(31) );
   21.        06     DECLARE LOPASS            ENTRY ( FRACT BYVALUE, FRACT BYVALUE, FRACT )
   22.        06                               RETURNS ( FRACT );
   23.        06     DECLARE LOPASS32          ENTRY ( FRACT BYVALUE, FRACT BYVALUE, FRACT(31) )
   24.        06                               RETURNS ( FRACT(31) );
   25.        06     DECLARE RATEDERIVER       ENTRY ( FRACT BYVALUE, FRACT, FRACT )
   26.        06                               RETURNS ( FRACT );
   27.        06     DECLARE RATELIMIT         ENTRY ( FRACT BYVALUE, FRACT BYVALUE, FRACT )
   28.        06                               RETURNS ( FRACT );
   29.        06
   30.        06     /**********  INPUT DECLARATIONS   **********/
   31.        06
   32.        06     DECLARE APENGMODOLD       BIT        EXTERNAL;
   33.        06     DECLARE CERMOD            BIT        EXTERNAL;
   34.        06     DECLARE CERPTHMALCON      BIT(16)    EXTERNAL EXTRA;
   35.        10     DECLARE CERPTHSTPCON      BIT(16)    EXTERNAL EXTRA;
   36.        06     DECLARE CERPTHSVOCON      BIT(16)    EXTERNAL EXTRA;
   37.        06     DECLARE CMD               BIT        EXTERNAL;
   38.        06     DECLARE COEGLIMFIL1       FRACT      EXTERNAL EXTRA;
   39.        06     DECLARE COEGLIMFIL2       FRACT      EXTERNAL EXTRA;
   40.        06     DECLARE COEGLIMFILLS      FRACT      EXTERNAL EXTRA;
   41.        06     DECLARE COEGLIMFILMS      FIXED      EXTERNAL EXTRA;
   42.        06     DECLARE COENORACC         FRACT      EXTERNAL EXTRA;
   43.        06     DECLARE COEPTHACCDER      FRACT      EXTERNAL EXTRA;
   44.        06     DECLARE COEPTHRATFIL      FRACT      EXTERNAL EXTRA;
   45.        06     DECLARE COEPTHSVOCMP      FRACT      EXTERNAL EXTRA;
   46.        06     DECLARE COEPTHSVOFAD      FRACT      EXTERNAL EXTRA;
   47.        06     DECLARE COEPTHWO          FRACT      EXTERNAL;
   48.        06     DECLARE GLIMMAX           FRACT      EXTERNAL EXTRA;
   49.        06     DECLARE GLIMMIN           FRACT      EXTERNAL EXTRA;
   50.        06     DECLARE GNPTH             POINTER    EXTERNAL EXTRA;
   51.        06     DECLARE GNPTHACC          POINTER    EXTERNAL EXTRA;
   52.        06     DECLARE GNPTHRAT          POINTER    EXTERNAL EXTRA;
   53.        06     DECLARE GNPTHTRBIN        FRACT      EXTERNAL EXTRA;
   54.        06     DECLARE HEX6666           BIT(16)    EXTERNAL EXTRA;
   55.        06     DECLARE HEX9999           BIT(16)    EXTERNAL EXTRA;
   56.        06     DECLARE HIGNPTH           POINTER    EXTERNAL EXTRA;
   57.        06     DECLARE MAXMINUS          FRACT      EXTERNAL EXTRA;
   58.        06     DECLARE MAXPLUS           FRACT      EXTERNAL EXTRA;
```

```
 59.    06    DECLARE MAXPTHCMD         POINTER   EXTERNAL EXTRA;
 60.    06    DECLARE NORACC            FRACT     EXTERNAL;
 61.    06    DECLARE OTHPTHMOD         BIT       EXTERNAL;
 62.    06    DECLARE PGMPTH            POINTER   EXTERNAL;
 63.    06    DECLARE PGMPTHACC         POINTER   EXTERNAL;
 64.    06    DECLARE PGMPTHRAT         POINTER   EXTERNAL;
 65.    06    DECLARE PTH               FRACT     EXTERNAL;
 66.    06    DECLARE PTHMOD            BIT       EXTERNAL;
 67.    06    DECLARE PTHCMD            FRACT     EXTERNAL;
 68.    06    DECLARE PTHCMDRATMAX      FRACT     EXTERNAL EXTRA;
 69.    06    DECLARE PTHCMDRATMIN      FRACT     EXTERNAL EXTRA;
 70.    06    DECLARE PTHRAT            FRACT     EXTERNAL;
 71.    06    DECLARE TRBMOD            BIT       EXTERNAL;
 72.    06    DECLARE XRXCOEPTHWO       FRACT     EXTERNAL;
 73.    06    DECLARE XRXPTHCMD         FRACT     EXTERNAL;
 74.    06
 75.    06    /**********    I/O DECLARATIONS    **********/
 76.    06
 77.    06    DECLARE FILNORACC         FRACT     EXTERNAL;
 78.    10    DECLARE GLIMPTHRAT        FRACT(31) EXTERNAL;
 79.    06    DECLARE GNPTHNOW          FRACT     EXTERNAL;
 80.    06    DECLARE OLDFILPTHRAT      FRACT(31) EXTERNAL;
 81.    06    DECLARE OLDNORACC         FRACT     EXTERNAL;
 82.    06    DECLARE OLDNORACC1        FRACT     EXTERNAL;
 83.    06    DECLARE OLDPTHACCDER      FRACT     EXTERNAL;
 84.    06    DECLARE OLDPTHCMDWO       FRACT(31) EXTERNAL;
 85.    06    DECLARE OLDPTHSVOCMP      FRACT(31) EXTERNAL;
 86.    06    DECLARE OLDPTHSVOFAD      FRACT     EXTERNAL;
 87.    06    DECLARE OLDRATPTHG        FRACT     EXTERNAL;
 88.    06    DECLARE PTHCMDRATLO       BIT       EXTERNAL;
 89.    06    DECLARE PTHERR            FRACT     EXTERNAL;
 90.    06    DECLARE PTHRAT1           FRACT     EXTERNAL;
 91.    06    DECLARE PTHSVOFADOUT      FRACT     EXTERNAL;
 92.    06
 93.    06    /**********    OUTPUT DECLARATIONS    **********/
 94.    06
 95.    06    DECLARE PTHSVOCMD         FRACT     EXTERNAL;
 96.    06
 97.    06    /**********    STACK DECLARATIONS    **********/
 98.    06
 99.    06    DECLARE ABSFILNORACC      FRACT     EXTERNAL INITIAL(*);
100.    06    DECLARE ABSFILPTHRAT      FRACT     EXTERNAL INITIAL(*);
101.    06    DECLARE CERPTHSTPON       BIT       EXTERNAL INITIAL(*);
102.    06    DECLARE CMDRATLIM         FRACT     EXTERNAL INITIAL(*);
103.    06    DECLARE COEPTHCMDWO       FRACT     EXTERNAL INITIAL(*);
104.    06    DECLARE DMPPTHERROR       FRACT     EXTERNAL INITIAL(*);
105.    06    DECLARE DMPPTHERROR1      FRACT     EXTERNAL INITIAL(*);
106.    06    DECLARE FILNORACC1        FRACT     EXTERNAL INITIAL(*);
107.    06    DECLARE FILNORACC2        FRACT     EXTERNAL INITIAL(*);
108.    06    DECLARE FILNORACC3        FRACT     EXTERNAL INITIAL(*);
109.    06    DECLARE FILPTHACC         FRACT     EXTERNAL INITIAL(*);
110.    06    DECLARE FILPTHACC1        FRACT     EXTERNAL INITIAL(*);
111.    06    DECLARE FILPTHRAT         FRACT(31) EXTERNAL INITIAL(*);
112.    06    DECLARE FILPTHRAT1        FRACT(31) EXTERNAL INITIAL(*);
113.    06    DECLARE LIMITPTHCMD       FRACT     EXTERNAL INITIAL(*);
114.    06    DECLARE PITCHDAMPING      FRACT     EXTERNAL INITIAL(*);
115.    06    DECLARE PTHCMD1           FRACT     EXTERNAL INITIAL(*);
116.    06    DECLARE PTHCMD2           FRACT     EXTERNAL INITIAL(*);
117.    06    DECLARE PTHCMDRATLIM      FRACT     EXTERNAL INITIAL(*);
118.    06    DECLARE PTHSVOCMDA        FRACT     EXTERNAL INITIAL(*);
119.    06    DECLARE PTHSVOCMDB        FRACT     EXTERNAL INITIAL(*);
120.    06    DECLARE PTHSVOCMDC        FRACT     EXTERNAL INITIAL(*);
121.    06    DECLARE PTHSVOCMDD        FRACT     EXTERNAL INITIAL(*);
122.    06    DECLARE RATLIMPTHCMD      FRACT     EXTERNAL INITIAL(*);
123.    06    DECLARE WOPTH             FRACT;
124.    06
125.    06    /**********    BASED DECLARATIONS.    **********/
126.    06
127.    06    DECLARE FRACTION          FRACT     BASED;
128.    06
129.    06
130.    06
131.    06    /**********    COMPUTATIONS    **********/
132.    06
133.    06    /*    TRANSFER    */
134.    06    ;/*    TURN SO ON    */;
135.    06    IF ( CMD )
136.    06       THEN PTHCMD1 = PTHCMD;
137.    06       ELSE PTHCMD1 = XRXPTHCMD;
138.    06
139.    06    IF ( CMD ) THEN COEPTHCMDWO = COEPTHWO;
140.    06                ELSE COEPTHCMDWO = XRXCOEPTHWO;
141.    06    IF ( NOT APENGMODOLD ) THEN OLDPTHCMDWO = PTH;
142.    06    WOPTH       = LOPASS32( PTH, COEPTHCMDWO, OLDPTHCMDWO );
143.    06    IF (( PTHMOD & CMD ) OR ( OTHPTHMOD & NOT CMD ))
144.    06       THEN PTHCMD2 = PTHCMD1;
145.    06       ELSE PTHCMD2 = PTHCMD1 + WOPTH;
146.    06
147.    06    /*    G LIMITED CMD RATE LIMIT    */
148.    06    FILNORACC   = LOPASS( NORACC, COENORACC, OLDNORACC );
```

```
149.      06      FILNORACC1   = LOPASS( FILNORACC, COEGLIMFIL1, OLDNORACC1 );
150.      06      FILNORACC2   = FILNORACC - COEGLIMFIL2 * FILNORACC1;
151.      06      FILNORACC3   = BIGMULT( FILNORACC2, COEGLIMFILMS, COEGLIMFILLS );
152.      06      ABSFILNORACC = ABS( FILNORACC3 );
153.      06      FILPTHRAT    = LOPASS32( PTHRAT, COEPTHRATFIL, OLDFILPTHRAT );
154.      06      FILPTHRAT1   = .033333333 * FILPTHRAT;
155.     )06      ABSFILPTHRAT = ABS( FILPTHRAT1 );
156.      09      IF ( NOT PTHCMDRATLO )
157.      09         THEN IF ( ABSFILPTHRAT LT PTHCMDRATMIN )
158.      09              THEN GLIMPTHRAT = PTHCMDRATMIN;
159.      09              ELSE GLIMPTHRAT = ABSFILPTHRAT;
160.      06      IF (( NOT PTHCMDRATLO ) AND ( ABSFILNORACC GT GLIMMAX ) AND
161.      06         ( GLIMPTHRAT LT PTHCMDRATMAX )) THEN PTHCMDRATLO = TRUE;
162.      06      IF ( PTHCMDRATLO AND ( ABSFILNORACC LT GLIMMIN )) THEN PTHCMDRATLO = FALSE;
163.      06      IF ( PTHCMDRATLO ) THEN PTHCMDRATLIM = GLIMPTHRAT;
164.      06                             ELSE PTHCMDRATLIM = PTHCMDRATMAX;
165.      06
166.      06      /*   LIMITER REMOVAL FOR CERTIFICATION    */
167.      10      CERPTHSTPON = CERMOD & (( PTHMOD & CMD ) OR ( OTHPTHMOD & NOT CMD ))
168.      10                  & NOT (( CERPTHMALCON = HEX6666 ) OR ( CERPTHMALCON = HEX9999 ))
169.      10                  & ( CERPTHSTPCON = HEX9999 );
170.      06      IF ( CERPTHSTPON ) THEN CMDRATLIM = MAXPLUS;
171.      06                             ELSE CMDRATLIM = PTHCMDRATLIM;
172.      06
173.      06      IF ( NOT APENGMODOLD ) THEN OLDRATPTHG = PTH;
174.      06      RATLIMPTHCMD = RATELIMIT( PTHCMD2, CMDRATLIM, OLDRATPTHG );
175.      06
176.      06      /*   PITCH MAGNITUDE LIMIT    */
177.      06      LIMITPTHCMD  = FUNCTION( MAXPTHCMD, RATLIMPTHCMD );
178.      06      PTHERR       = LIMITPTHCMD - PTH;
179.      06
180.      06      /*   PITCH INNER LOOP DAMPING   */
181.      06      PTHRAT1      = PTHRAT * FUNCTION( GNPTHRAT, PGMPTHRAT PT FRACTION );
182.      06      FILPTHACC    = RATEDERIVER( PTHRAT, COEPTHACCDER, OLDPTHACCDER );
183.      06      FILPTHACC1   = FILPTHACC * FUNCTION( GNPTHACC, PGMPTHACC PT FRACTION );
184.      06      PITCHDAMPING = PTHRAT1 + FILPTHACC1;
185.      06      DMPPTHERROR  = PTHERR - PITCHDAMPING;
186.      06
187.      06      DMPPTHERROR1 = BIGMULT( DMPPTHERROR, 25, .0 );
188.      06      GNPTHNOW     = FUNCTION( GNPTH, PGMPTH PT FRACTION );
189.      06      PTHSVOCMDD   = DMPPTHERROR1 * GNPTHNOW;
190.      06      PTHSVOCMDC   = LAG32( PTHSVOCMDD, COEPTHSVOCMP, OLDPTHSVOCMP );
191.      06
192.      06      /*   HIGH GAIN REGION    */
193.      06      PTHSVOCMDB = FUNCTION( HIGNPTH, PTHSVOCMDC );
194.      06
195.      07      /*   INNER LOOP TURB MODE   */
196.      07      IF ( TRBMOD )
197.      07         THEN PTHSVOCMDA = GNPTHTRBIN * PTHSVOCMDB;
198.      07         ELSE PTHSVOCMDA = PTHSVOCMDB;
199.      07
200.      06      /*   SERVO COMMAND FADER    */
201.      06      IF ( NOT APENGMODOLD ) THEN OLDPTHSVOFAD = PTHSVOCMDA;
202.      06      PTHSVOFADOUT = LOPASS( .0, COEPTHSVOFAD, OLDPTHSVOFAD );
203.      06
204.      06      /*   SERVO CONTROL FOR CERTIFICATION    */
205.      06      IF ( CERPTHSVOCON = HEX9999 )
206.      06         THEN PTHSVOCMD = MAXPLUS;
207.      06         ELSE IF ( CERPTHSVOCON = HEX6666 )
208.      06              THEN PTHSVOCMD = MAXMINUS;
209.      06
210.      06              ELSE PTHSVOCMD = PTHSVOCMDA - PTHSVOFADOUT;
211.      06
212.     )06
213.      06      RETURN;
214.      06      END PITCHINNER;
```

END ELT. ERRORS: NONE. TIME: 0.850 SEC. IMAGE COUNT: 214 aHDG,N

We claim:

1. An autopilot pitch command apparatus having a specified maximum pitch rate control output comprising:
   a. first means for receiving a sensed vertical acceleration signal;
   b. second means for receiving a sensed pitch rate signal;
   c. third means, coupled to said first means, for lead compensating said sensed vertical acceleration signal; and
   d. fourth means, coupled to said second means, and to said third means, for detecting when said lead compensated acceleration signal exceeds the absolute value of a first predetermined factor, and for requiring said autopilot pitch command apparatus to limit as a function of said detection, said pitch control output to said presently-sensed pitch rate as a maximum.

2. An autopilot pitch command apparatus as in claim 1 wherein said fourth means is additionally for detecting when said lead compensated acceleration signal becomes less than the absolute value of a second predetermined factor, said second factor less than said first, and for resetting said maximum pitch rate to said specified maximum as a function of said additional detection.

3. An autopilot pitch command apparatus having a specified maximum pitch rate control output comprising:
   a. first means for receiving a sensed vertical acceleration signal;
   b. second means for receiving a sensed pitch rate signal;
   c. third means coupled to said first means, for lead compensating said sensed vertical acceleration signal; and
   d. fourth means coupled to said second means, and to said third means, for detecting when said lead compensated acceleration signal exceeds the absolute value of a first predetermined factor, and for requiring said autopilot pitch command apparatus to temporarily limit as a function of said detection, said pitch control output to said presently-sensed pitch rate as a temporary maximum, said fourth means additionally for detecting when said lead compensated acceleration signal becomes less than the absolute value of a second predetermined factor, said second factor less than said first, and for resetting said pitch control output limit to said specified maximum as a function of said additional detection wherein said temporary limit is set to said presently-sensed pitch rate for a maximum duration of 5 seconds.

* * * * *